(12) United States Patent
Gieras et al.

(10) Patent No.: US 8,310,118 B2
(45) Date of Patent: Nov. 13, 2012

(54) PACKAGING IMPROVEMENT FOR CONVERTER-FED TRANSVERSE FLUX MACHINE

(75) Inventors: Jacek F. Gieras, Glastonbury, CT (US); Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 306 days.

(21) Appl. No.: 12/725,855

(22) Filed: Mar. 17, 2010

(65) Prior Publication Data

US 2011/0227460 A1 Sep. 22, 2011

(51) Int. Cl.
*H02K 11/04* (2006.01)
(52) U.S. Cl. ...................................... 310/68 D
(58) Field of Classification Search ............... 310/68 D, 310/254.1; 290/31
See application file for complete search history.

(56) References Cited

U.S. PATENT DOCUMENTS

| | | | |
|---|---|---|---|
| 5,491,370 A | 2/1996 | Schneider et al. | |
| 5,543,674 A * | 8/1996 | Koehler | 310/164 |
| 6,462,429 B1 * | 10/2002 | Dhyanchand et al. | 290/31 |
| 6,838,778 B1 | 1/2005 | Kandil et al. | |
| 6,838,779 B1 | 1/2005 | Kandil et al. | |
| 7,109,681 B2 | 9/2006 | Baker et al. | |
| 7,253,535 B2 | 8/2007 | Duesterhoeft | |
| 7,312,549 B2 * | 12/2007 | Rasmussen | 310/168 |
| 2002/0047455 A1 * | 4/2002 | Dhyanchand et al. | 310/211 |
| 2008/0111420 A1 | 5/2008 | Anghel et al. | |

OTHER PUBLICATIONS

Bin Wu, Shashi Diwan, Goordon Slemon, "PWM—CSI Inverter for Induction Motor Drives," IEEE Trans. Industry Applications, vol. 1A-28, No. 1, pp. 64-70, 1992.

J.H. Zhao, et al., the First 4H-SiC BJT-based 20 kHz, 7HP PWM DC-to-AC Inverter for Induction Motor Control Applications.

M. Mohr, et al., "Dimensioning of a Current Source Inverter for the Feed-in of Electrical Energy from Fuel Cells to the Mains".

* cited by examiner

*Primary Examiner* — Nguyen N Hanh
(74) *Attorney, Agent, or Firm* — Carlson, Gaskey & Olds, PC

(57) ABSTRACT

A transverse flux machine has at least three phases, each provided by a stator core and phase windings. Each of the at least three phases is captured within a common housing. Parallel lines extend from the at least three phases, and a current source converter is created on each of the parallel lines by inductors, a switching network, and communicating capacitors, which are received within the common housing.

15 Claims, 6 Drawing Sheets

PACKAGING IMPROVEMENT FOR CONVERTER-FED TRANSVERSE FLUX MACHINE

BACKGROUND OF THE INVENTION

This application relates to a transverse flux machine, which may operate as a motor or a generator, and wherein a solid state current source power converter is incorporated into a compact package.

Transverse flux machines are known, and essentially are a multi-pole electrical machine. The stator consists of a single cylindrical coil for phase, with salient ferromagnetic poles. The rotor consists of permanent magnets. In a transverse flux machine, an electromagnetic force vector between the rotor and stator is perpendicular to the plane of magnetic flux lines. In standard flux machines, the electromagnetic force vector is parallel to the plane of the magnetic flux line. The transverse flux machine has a number of benefits over such standard machines, as are known.

Typically, a transverse flux machine has been provided with an inverter that is voltage sourced, and provided by a large capacitor. Packaging for a machine using a voltage source inverter would prove challenging.

SUMMARY OF THE INVENTION

A transverse flux machine has at least three phases each provided by a stator core and phase windings. Each of the at least three phases is captured within a common housing. Parallel lines extend from the at least three phases, and a current source converter is provided and received within the common housing.

These and other features of the present invention can be best understood from the following specification and drawings, the following of which is a brief description.

DETAILED DESCRIPTION OF THE PREFERRED EMBODIMENT

Figure 1:
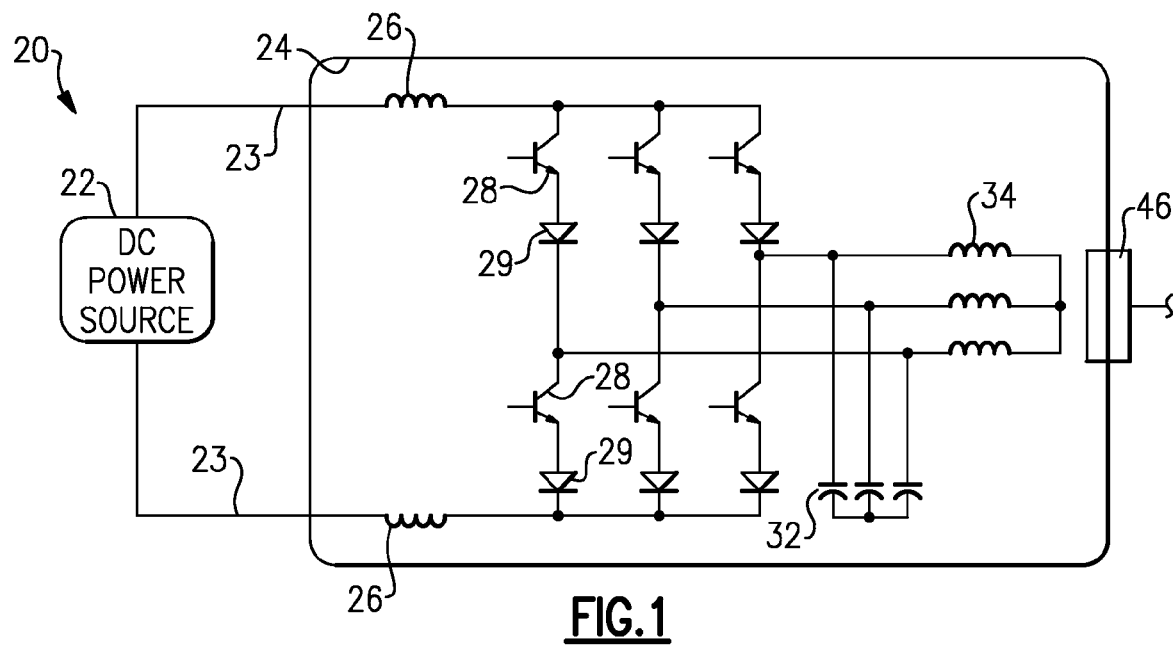
FIG. 1 shows a schematic of a first embodiment.

A schematic for a transverse flux motor drive 20 for a transverse flux machine 24 is illustrated in FIG. 1. A DC power source 22 is connected to parallel lines 23, each passing through an inductor 26. The inductors 26, a switching network having solid state switches 28, diodes 29, and commutating capacitors 32, together form a current source converter. The switching network including solid state switches 28, diodes 29, and Wye-connected capacitors 32 provide a power module. The solid state switches 28 may be transistors.

Figure 2:
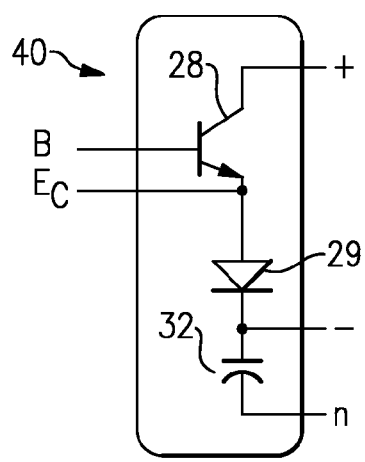
FIG. 2 shows an electrical schematic power module.

FIG. 2 shows the combination made as a single power module 40 which can be utilized to create the circuit of the transverse flux motor drive 20. Motor windings 34 are positioned downstream of the module 40, and are operable to drive a rotor 46, shown schematically in FIGS. 1 and 2.

Figure 3:
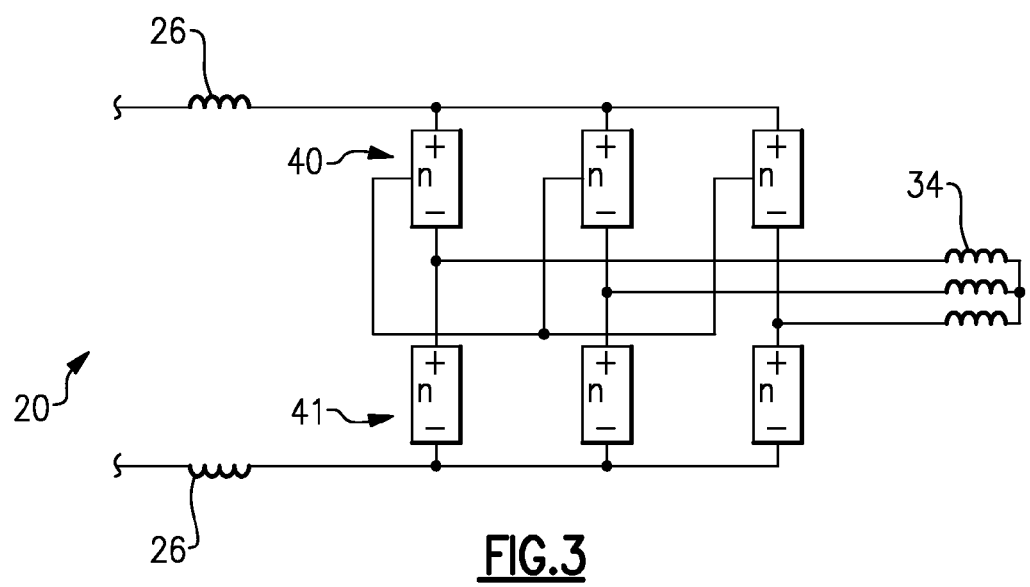
FIG. 3 shows the FIG. 1 schematic reconfigured in view of the FIG. 2 module.

FIG. 3 shows the circuitry of transverse flux machine drive 20 reconfigured utilizing 6 of the modules 40 of FIG. 2, with three modules (identified as 41) providing a lower leg and the modules 40 providing an upper leg.

Figure 4:
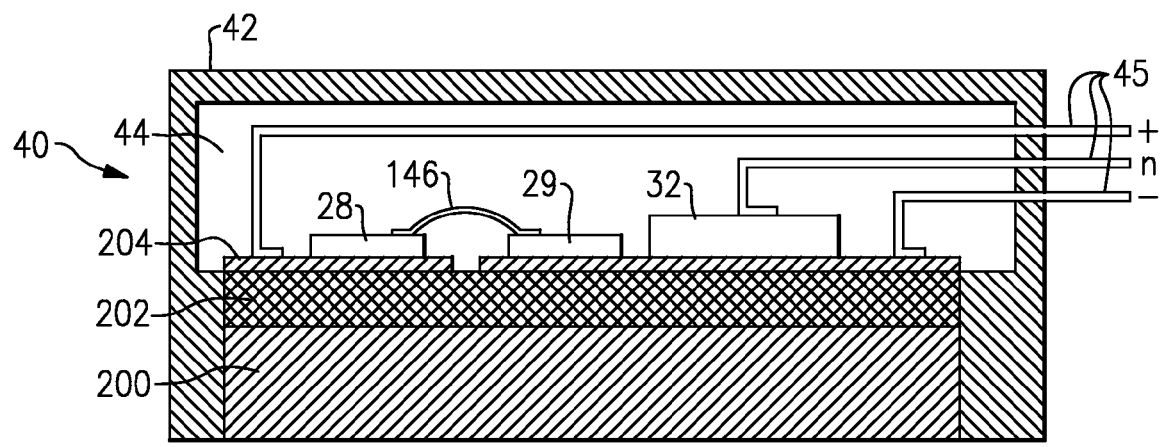
FIG. 4 is a cross-sectional view through a FIG. 2 module.

The modules 40, 41 allow for convenient packaging as will be explained below. As shown in FIG. 4, each of the modules 40 (or 41) may include a plastic outer housing 42, silicone gel or thermoplastic insulating resin 44, a bonding wire 146 connecting each switch 28 to each diode 29. Notably, the switch 28 may be a silicon carbide bipolar junction transistor (SiCBJT), SiCMOSFET, or SiCJFET. The diode 29 may be a silicon carbide Schottky diode. The module 40 may also incorporate aluminum silicon carbide baseplate 200, Al N insulating substrate 202, and AlSiC pads 204. Notably, embodiments of modules 40 or 41 can extend to any number of other type components and materials. The above are given as examples only. Output lines 45 extend from each module and are connected as shown in FIG. 3.

Figure 5:
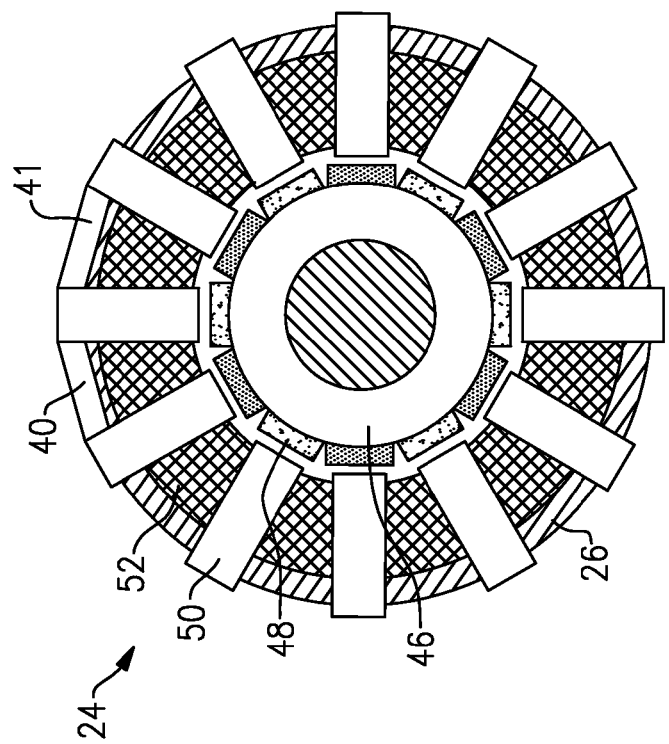
FIG. 5 shows one phase of a machine.

FIG. 5 shows the integration of a single phase of a transverse flux machine 24 to incorporate the power modules 40 and 41, where the transverse flux machine 24 may be driven by transverse flux machine drive 20 of FIGS. 1 and 3. As shown, the modules 40 and 41 are placed circumferentially between adjacent stator core pole pieces 50. Stator coil 52 is positioned to extend as a cylindrical coil between all of the stator core pole pieces 50.

An inductor 26 can be seen to be positioned into the plane of the page of this paper. The rotor 46 has a plurality of permanent magnets 48.

Figure 6:
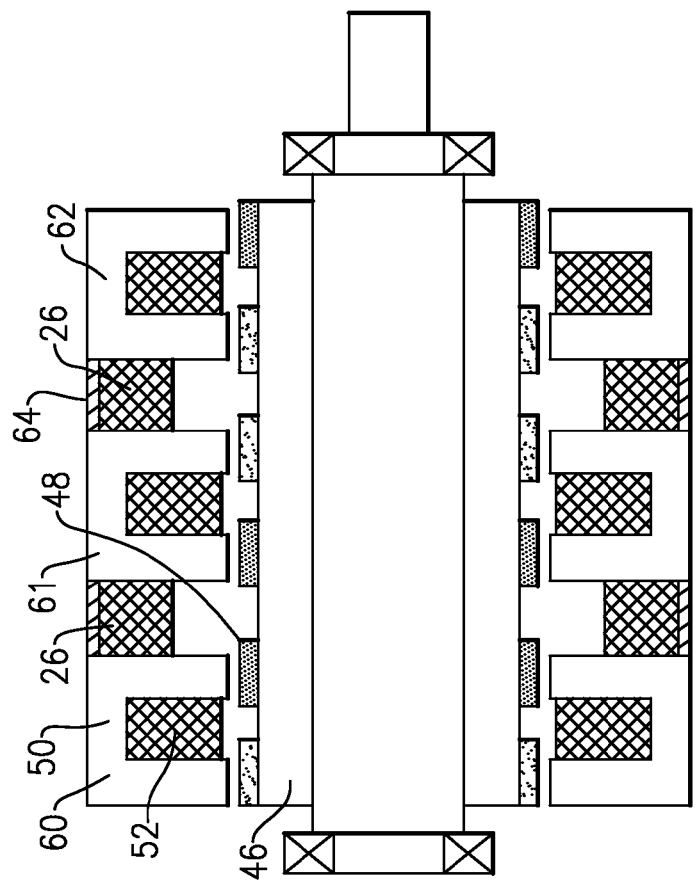
FIG. 6 shows three phases of a machine.

As shown in FIG. 6, three such combined phases can be placed to form three phases 60, 61, and 62. The inductors 26 are positioned between the phases 60, 61, and 62. The cylindrical spacer 64 secures the inductor 26 in the housing. In this manner, not only can the power modules 40 and 41 be packaged within the overall envelope of the housing, but so can the relatively large inductors 26.

Figure 7A:
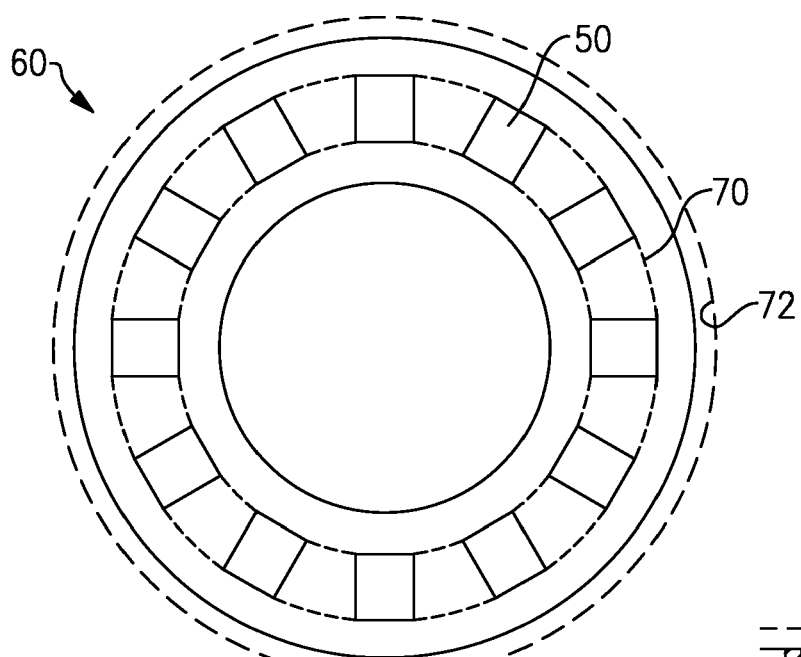
FIG. 7A shows a construction of one of the phases.
Figure 7C:
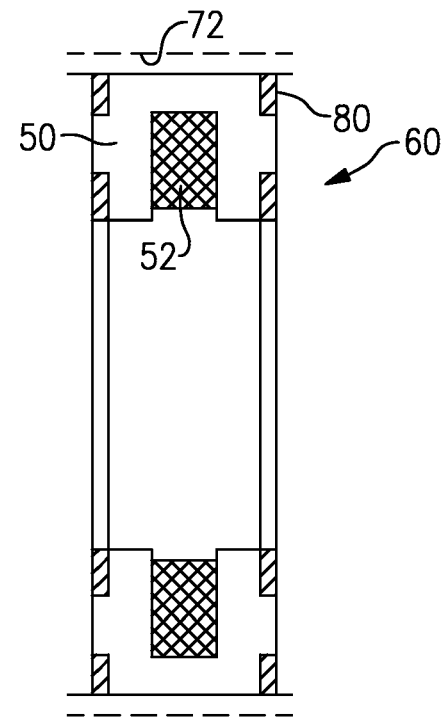
FIG. 7C is a cross-sectional view through the FIG. 7A embodiment.
Figure 7B:
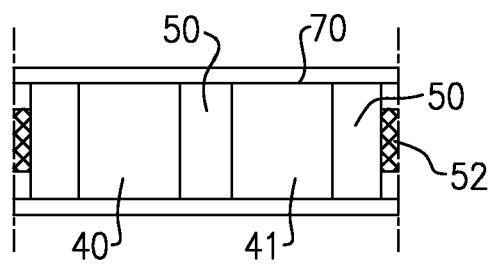
FIG. 7B shows an outer view of the FIG. 7A embodiment.

FIG. 7A shows a single one of the phases 60 having the core pole piece 50 surrounded by a nonferromagnetic disk 70. The nonferromagnetic disks 70 are used to keep all stator cores 50 and coils 52 together. An outer housing outline 72 is also shown. As can be appreciated from FIG. 7B, the modules 40 and 41 will be positioned within this same housing. FIG. 7C shows the location of the stator coil 52 as provided by a ring-shaped coil.

Figure 8:
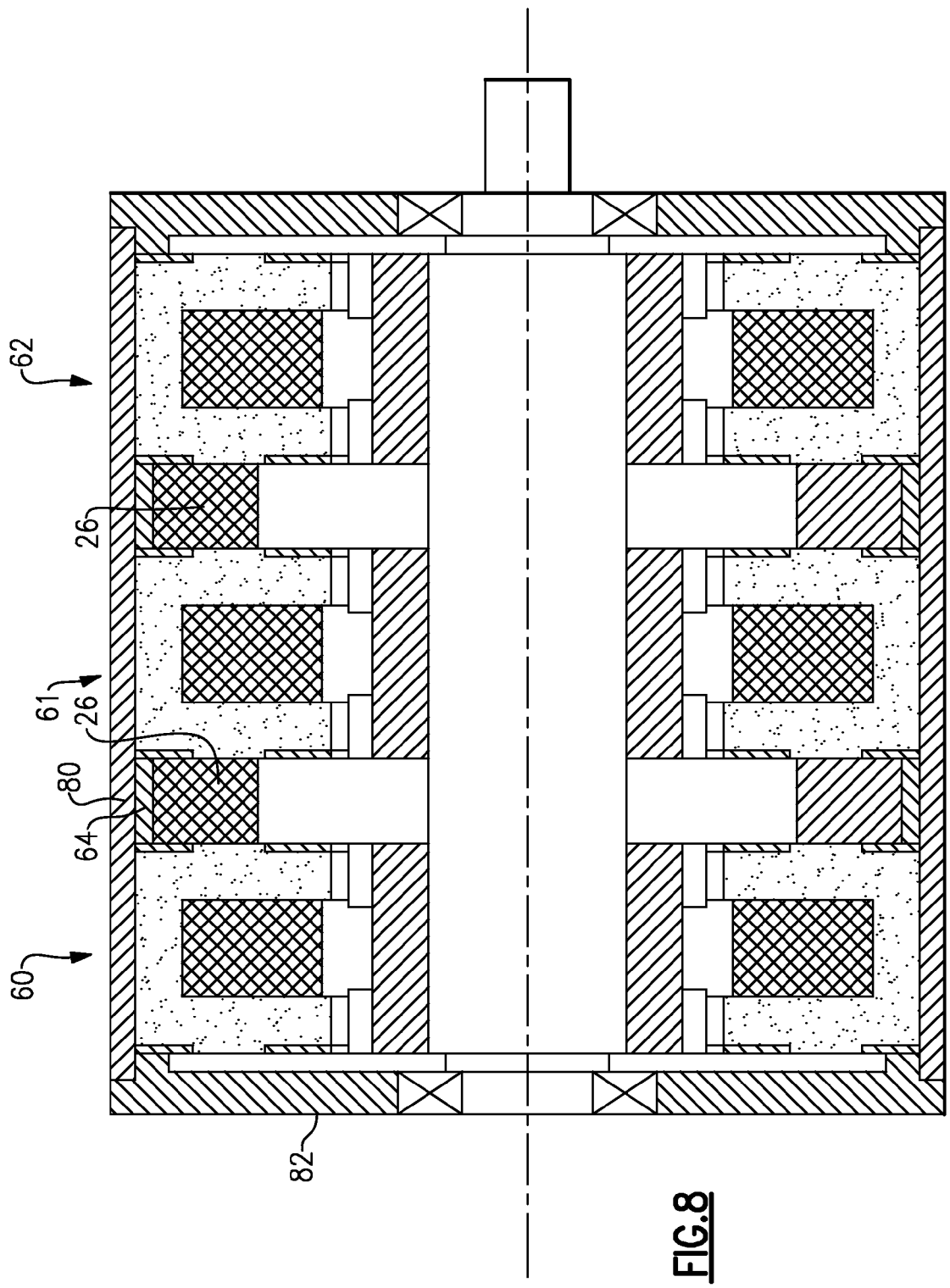
FIG. 8 shows a fully assembled machine.

FIG. 8 shows the overall assembly. As shown, an outer housing shell 80 which may be cylindrical in shape surrounds the three phases 60, 61, and 62, the intermediate captured inductors 26 and spacers 64. Bell housings 82 provide two end housing plates to secure all of the components together in a housing provided by shell 80 and end plates 82. While the power modules 40 and 41 are not illustrated in this cross-section, it should be understood that they would be spaced into the plane of the paper, and as previously disclosed.

Figure 9:
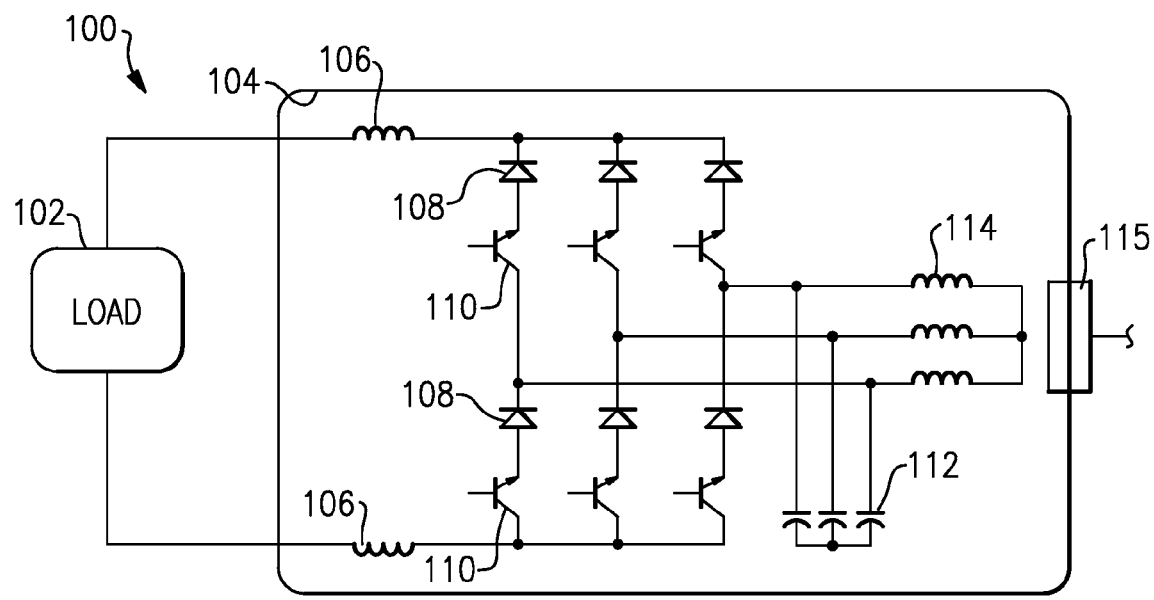
FIG. 9 shows a second embodiment schematic.

The machine as described to this point would be operable as a motor. However, similar machines can be provided which can operate as a generator. The arrangement of the switches 28 and diodes 29 in the power module 40, 41 must be changed such that they now look like those shown in FIG. 9. A driven rotor 115 is driven by a prime mover to rotate adjacent to the generator windings 114. The generator windings 114 generate current which is passed back upstream to a load 102. A housing 104, inductors 106, switches 110, and diodes 108, along with capacitors 112 are provided as an earlier embodiment.

Figure 10:
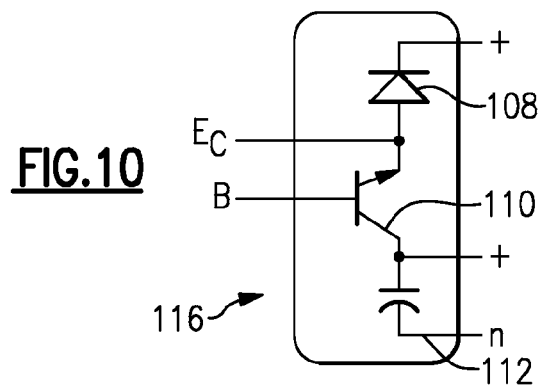
FIG. 10 shows an electrical schematic of a module as incorporated into the FIG. 9 embodiment.
Figure 11:
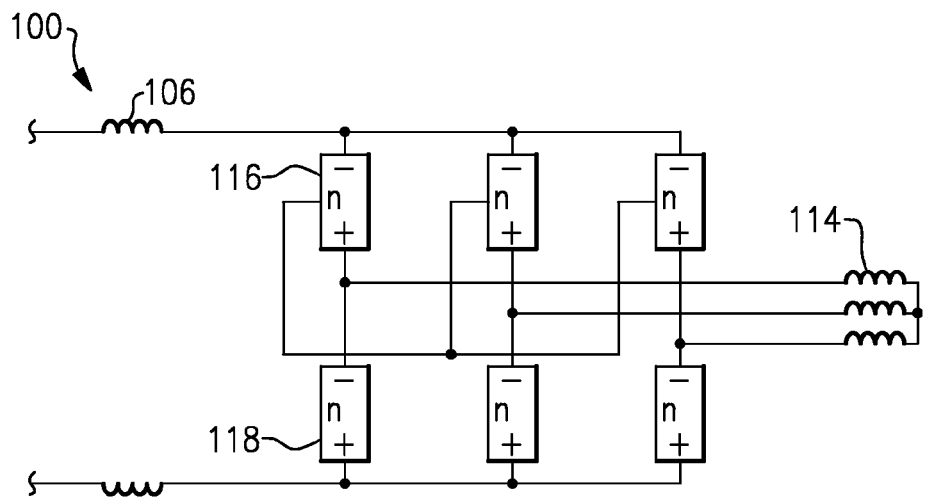
FIG. 11 shows the FIG. 9 schematic redrawn utilizing the module of FIG. 10.

As shown in FIG. 10, the power module 116 is reconfigured such that the arrangement of the switch 110 and diode 108 is changed from the earlier embodiment depicted in FIG. 2. Similarly, the circuit 100 in FIG. 11 which incorporates the modules 116 look somewhat different than that in the earlier embodiment of FIG. 3. As in FIG. 3, the circuit 100 of FIG. 11 includes three modules (identified as 118) providing a lower leg and the modules 116 providing an upper leg. However, for packaging purposes, the power modules 116 and 118 and the inductors 106 can be packaged as within the earlier embodiment.

A worker of ordinary skill in the art would recognize how to connect the various components as set forth in the housing diagram figures of FIGS. 5, 6 and 8, for example. The schematics of FIG. 1, 3, 9 or 11 will teach all that is needed to this worker to properly connect the various components in the arrangement as shown in FIGS. 5, 6 and 8.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A transverse flux machine comprising:
   at least three phases each provided by a stator core and windings;
   each of said at least three phases captured within a common housing;
   parallel lines extending from said at least three phases, and a current source converter created by inductors on each of said parallel lines, a switching network, and commutating capacitors; and
   said inductors received within said common housing.

2. The transverse flux machine as set forth in claim 1, wherein said inductors are positioned to be physically intermediate at least two of said at least three phases.

3. The transverse flux machine as set forth in claim 2, wherein one of said inductors is positioned between a first and a second of said phases, and the second of said inductors is positioned between a second and a third of said phases.

4. The transverse flux machine as set forth in claim 3, wherein said inductors are positioned to be in parallel with each other, and said at least three phases are positioned on the same side of said input lines relative to said inductor.

5. The transverse flux machine as set forth in claim 1, wherein power modules including at least a switch and a diode are positioned in said common housing.

6. The transverse flux machine as set forth in claim 5, wherein said power modules include both an upper leg and a lower leg.

7. The transverse flux machine as set forth in claim 6, wherein said power modules are positioned circumferentially between two pole pieces of said stator.

8. The transverse flux machine as set forth in claim 7, wherein an upper leg power module is positioned on one side of a pole piece and a lower leg power module is positioned on an opposed side of said pole piece.

9. The transverse flux machine as set forth in claim 5, wherein said power module also includes a capacitor.

10. The transverse flux machine as set forth in claim 9, wherein said power module is constructed to allow said transverse flux machine to operate as a motor.

11. The transverse flux machine as set forth in claim 9, wherein said power module is constructed to operate said transverse flux machine as a generator.

12. A transverse flux machine comprising:
    a housing provided by a cylindrical housing shell extending between two end housing plates;
    at least three phases of electric circuits provided within said housing, each provided by a stator core and a winding;
    parallel lines extending from said at least three phases, and a current source converter created by inductors on each of said parallel lines, a switching network, and commutating capacitors; and
    said inductors received within said housing.

13. The transverse flux machine as set forth in claim 12, wherein one of said inductors is positioned between a first and a second of said phases, and the second of said inductors is positioned within a second and a third of said phases.

14. The transverse flux machine as set forth in claim 12, wherein power modules including switches and diodes are positioned in said housing.

15. The transverse flux machine as set forth in claim 14, wherein said power module also includes a capacitor.

\* \* \* \* \*